(12) United States Patent
Wachi et al.

(10) Patent No.: US 6,273,526 B1
(45) Date of Patent: Aug. 14, 2001

(54) FLUID PRESSURE BOOSTER AND BRAKE SYSTEM USING THE SAME

(75) Inventors: Yuzi Wachi; Toshiaki Fukushima, both of Saitama (JP)

(73) Assignee: Jidosha Kiki Co., Ltd., Tokyo (JP)

( * ) Notice: Subject to any disclaimer, the term of this patent is extended or adjusted under 35 U.S.C. 154(b) by 0 days.

(21) Appl. No.: 09/395,172

(22) Filed: Sep. 14, 1999

(30) Foreign Application Priority Data

Oct. 22, 1998 (JP) .................................................. 10-301157

(51) Int. Cl.[7] ........................................................ B60T 8/44
(52) U.S. Cl. ...................... 303/114.1; 188/356; 303/114.3
(58) Field of Search ............................. 303/113.3, 114.1, 303/114.3; 188/356, 357

(56) References Cited

U.S. PATENT DOCUMENTS

| | | | | |
|---|---|---|---|---|
| 4,610,483 | * | 9/1986 | Matsumoto et al. | 303/114.3 |
| 4,828,337 | * | 5/1989 | Wagner et al. | 303/114.3 |
| 5,078,457 | * | 1/1992 | Rittmannsberger et al. | 303/113.3 |
| 5,098,170 | * | 3/1992 | Watanbe | 303/113.3 |
| 5,133,592 | * | 7/1992 | Wagner et al. | 303/114.3 |
| 5,746,057 | * | 5/1998 | Shim | 303/114.3 |

FOREIGN PATENT DOCUMENTS 9-164938   6/1997   (JP) ................................ B60T/13/14

* cited by examiner

*Primary Examiner*—Robert J. Oberleitner
*Assistant Examiner*—Thomas J. Williams
(74) *Attorney, Agent, or Firm*—Sughrue, Mion, Zinn, Macpeak & Seas, PLLC

(57) ABSTRACT

In a fluid pressure booster, an input rod 7 and a valve member 6 are stroked forward during the operation so as to cause a control valve to be switched over. The atmosphere is introduced into a working pressure chamber 30 via the control valve 41 and a power piston 19 then operates to make a negative pressure booster 1 produces an output from a output rod 13. As the atmosphere in the working pressure chamber 30 acts backward on a control piston 25 at this time, the valve member 6 will not be stroke further. However, the output rod 13 is continuously stroked forward and kept producing the output. Due to the stop of stroke of the valve member 6, the stroke of the input rod 7 is suppressed and set at an extremely short stroke. When the negative pressure falls, the negative pressure booster 12 produces an output from the output rod 13 since the input rod 7, the valve member 6 and the output rod 13 integrally give a stroke forward.

7 Claims, 10 Drawing Sheets

FLUID PRESSURE BOOSTER AND BRAKE SYSTEM USING THE SAME

BACKGROUND OF THE INVENTION

1. Field of the Invention

This invention relates to the field of fluid pressure boosters such as negative pressure boosters, hydraulic pressure boosters and the like for boosting the input provided to an input means and outputting the boosted input using fluid pressure and particularly to the field of a fluid pressure booster in which the stroke of an input means is set extremely short, to ensure that fluid pressure can be outputted with a simple arrangement when the fluid pressure falls. Also, this invention relates to the field of a brake system in which the stroke of a brake operating member such as a brake pedal and the like is set extremely short to ensure that a brake can be actuated with a simple arrangement when fluid pressure falls.

2. Description of the Related Art

In order to obtain greater braking force with less pedal stepping force in conventional automobile brake systems, there have heretofore been employed fluid pressure boosters for generating a greater output by boosting the pedal stepping force with fluid pressure. As one of the fluid pressure boosters as stated above, there is a fluid pressure booster which is designed to gain a greater output by boosting the pedal stepping force with the negative pressure.

FIG. 10 is a sectional view showing a conventional ordinary negative pressure booster by way of example. As shown in FIG. 10, a negative pressure booster a comprises a front shell b, a rear shell c, a power piston member d, a diaphragm e, a power piston f, a vacuum chamber g, a working pressure chamber h, a valve body i, an input rod j, a valve plunger k, an atmospheric valve seat m provided for the valve plunger k, a vacuum valve seat n provided for the valve body i, a control valve disc o, a control valve p, passage holes q and r, an output rod s, a return spring t, a reaction disc u, a negative pressure inlet pipe v, and an atmosphere inlet port w.

In this conventional negative pressure booster a, negative pressure is kept being introduced into the vacuum chamber g via the negative pressure inlet pipe v. In the non-operating condition of the negative pressure booster a, further, the atmospheric valve seat m of the control valve p is kept into contact with the control valve disc o, which is slightly separated from the vacuum valve seat n or seated on the vacuum valve seat n (in this example shown, the control valve disc o is seated on the vacuum valve seat n), and the control valve p is in the non-operating condition. Therefore, the working pressure chamber h is cut off from the atmosphere and caused to communicate with the vacuum chamber g via the passage hole r, the gap between the control valve disc o and vacuum valve seat n, and the passage hole q. In this condition, the negative pressure is introduced into the working pressure chamber h or otherwise the working pressure chamber h is cut off any one of the atmosphere and vacuum chambers g. Moreover, a pressure slightly higher than the pressure in the vacuum chamber g facing the return spring t is introduced into the working pressure chamber h so that the control valve disc o may be seated on any one of the atmospheric valve seat m and vacuum valve seat n.

When a brake pedal (not shown) is stepped on out of the above condition, the input rod j is stroked forward (to the left in FIG. 10) and the atmospheric valve seat m separates from the control valve disc o when the control valve disc o is seated on the vacuum valve seat n or the atmospheric valve seat m immediately separates from the control valve disc o. In other words, the control valve p is switched over. Then the atmosphere is introduced from the atmosphere inlet port w into the working pressure chamber h via the gap between the control valve disc o and atmospheric valve seat m, and the passage hole r. As a predetermine difference in pressure is thus produced between the working pressure chamber h and vacuum chamber g, the power piston f including the power piston member d and the diaphragm e operates to generate an output. This output is then transferred to the master cylinder (hereinafter called MCY) of a brake (not shown) via the valve body i, the reaction disc u and the output rod s, whereby the MCY operates to generate brake pressure for operating the brake.

As the pressure in the working pressure chamber h increases, the output of the power piston f grows greater, thus making the valve body i move forward further, and the atmospheric valve seat m is brought into contact with the control valve disc o seated on the vacuum valve seat n. Accordingly, the atmosphere will not be introduced into the working pressure chamber h any further, so that the pressure in the working pressure chamber h becomes what corresponds to the input (the force related to the pedal stepping force) supplied to the input rod j. The output of the power piston at this time becomes what is obtained by boosting the pedal stepping force, which results in causing the MCY to generate brake pressure. Then the valve plunger k is brought into contact with the reaction disc u, which is subjected to elastic deformation because it is clamped between the valve body i and output rod s. The force generated by the elastic deformation of the reaction disc u is transmitted to the brake pedal as counterforce via the valve plunger k and the input rod j.

When the brake pedal is released, the input rod j and the valve plunger k both are moved back and the atmospheric valve seat m is brought into contact with the control valve disc o and further the control valve disc o separates from the vacuum valve seat n. Then the atmosphere introduced into the working pressure chamber h is discharged from the negative pressure inlet pipe v via the gap between the control valve disc o and vacuum valve seat n, the passage hole q and the vacuum chamber g. Consequently, all of the power piston f, valve body i and output rod s are moved back to take the non-operating position and the control valve p also takes the non-operating position.

Thus, this negative pressure booster makes a greater output obtainable with small pedal stepping force.

Recently, the stroke of the brake pedal in such a brake system as mentioned above has been desired to be contracted as much as possible. In the aforementioned conventional negative pressure booster, however, the valve body i is inevitably moved forward together with the forward movement of the power piston f as well as the output rod s when the output of the power piston f is produced in operation. Since the control valve p provided in the valve body i is also greatly moved forward, the input rod j necessarily produces a large stroke. Due to the loss stroke (the stroke of the MCY piston until the MCY actually produces the brake pressure) in the brake system ahead of the MCY, moreover, the valve body i, the power piston f and the output rod s are considerably moved forward. Consequently, the pedal stroke still remains large in the conventional negative pressure booster and this makes it impossible to meet the aforementioned demand for the contraction of the pedal stroke as much as possible.

The provision of the control valve (though not shown) for the power piston in any one of the conventional fluid pressure boosters designed for boosting the pedal stepping force with the fluid pressure causes the power piston to move forward considerably together with the control valve likewise, thus resulting in making greater the stroke of the input rod, that is, the pedal stroke.

Particularly in the case of braking (low speed reducing braking, that is, slow braking) in the low G zone, the idle stroke of the brake cylinder, master cylinder and booster out of the pedal stroke accounts for a large percentage and it is more difficult to shorten the stroke as the idle stroke is indispensable for preventing brake dragging.

Moreover, there is a fluid pressure booster wherein a control valve apart from a power piston is provided in parallel to a power piston within a housing (e.g., JP-A 9-164938). In this fluid pressure booster, the ends of a rocking lever fitted to an input rod are respectively coupled to the control valve and the power piston so that the ends thereof are capable of rocking. In other words, the input applied to the input rod is used to operate the control valve and the power piston via this lever. Therefore, since the lever is moved forward together with the stroke of the power piston during the operation, the stroke of the input rod still becomes larger. Moreover, the fluid pressure booster tends to become complicated in construction because the lever is fitted to the input rod, control valve and the power piston in such a manner as to be capable of rocking with a predetermined lever ratio and because the input of the input rod is used to operate and control the control valve and power piston with the lever ratio.

On the other hand, there is a full power brake system as a conventional brake system wherein the pedal stroke can be shortened. This full power brake system (though not shown) is different from the aforementioned negative or liquid pressure booster in that the brake is not actuated by activating MCY using the output of a power piston and then introducing the brake pressure generated by the MCY into a brake actuator. In the full power brake system, a brake valve for controlling supply and discharge of a working fluid under the control of a brake pedal without using the power piston and a brake actuator for producing the brake force are installed. Further, the brake is actuated by operating the brake valve to directly introduce the fluid pressure in a fluid pressure source into the brake actuator. In the full power brake system, since the brake valve is simply operated during the operation of the system, the pedal stroke can be relatively smaller but the problem is that the system becomes complicated to ensure the operation of the brake by stepping on the brake pedal when the fluid pressure falls.

Therefore, it is not so simple to apply the arrangement of the short pedal stroke in that full power brake to the fluid pressure booster having the power piston.

SUMMARY OF THE INVENTION

An object of the present invention made under the aforementioned circumstances is to provide a fluid pressure booster wherein the stroke of input means can be set at an extremely short stroke to ensure that with a simple arrangement, an output can be produced by input means even when the fluid pressure falls.

Another object of the present invention is to provide a fluid pressure booster wherein the stroke of a brake operating member such as a brake pedal can be made an extremely short stroke to ensure that with a simple arrangement, the brake is actuated by the brake operating member.

In order to solve the foregoing problems, a fluid pressure booster according to a first aspect of the invention includes, within a housing, a working piston for producing a working output by the action of a fluid pressure during the operation of the booster, control means provided to the working piston in series, at least part of the control means being capable of contacting the working piston in order to control supply and discharge of the fluid pressure caused to act on the working piston, input means for controlling the control means by stroking during the operation thereof and applying an input to the working piston via the control means when the fluid pressure falls, and a control piston which operates to suppress the stroke of the input means using the fluid pressure acting on the working piston during the operation thereof.

According to a second aspect of the invention, the control means is controlled with the fluid pressure and the input so that the fluid pressure acting on the working piston during the operation of the booster may be a pressure corresponding to the input of the input means.

According to a third aspect of the invention, stroke control means is provided between the control means and the input means.

According to a fourth aspect of the invention, the stroke control means is provided with a spring provided compressively between the control means and the input means.

According to a fifth aspect of the invention, the fluid pressure booster is a negative pressure booster for boosting the input using a negative pressure or a liquid pressure booster for boosting the input using a liquid pressure.

According to a sixth aspect of the invention, a brake system at least comprises a fluid pressure booster as claimed in the above aspects of the invention, and a brake master cylinder which is operated using the output of the fluid pressure booster and used to generate a brake pressure.

In the fluid pressure booster thus arranged, when the control means is operated and controlled by the input applied to the input means during the operation, the control means makes the fluid pressure act on the working piston, so that the working piston thus operated to produce an output. At this time, since the fluid pressure acting on the working piston also acts on the control piston, the control piston operates to make the stroke of the input means an extremely short stroke to the extent that the operating amount of the control means needed to make the necessary fluid pressure act on the working piston, that is, for only the purpose of switching the supply to discharge of fluid pressure in the control means. Thus, the working piston is kept stroking with the fluid pressure acting thereon even though the stroke of the input means is suppressed to be an extra short stroke, so that a greater output resulting from boosting the input of the input means is produced.

Further, the working piston and control means are provided in series and when the control means makes a relative movement with respect to the working piston, the control means is brought into contact with the working piston. When the fluid pressure falls, the working piston is also operated by the stroke of the input means via the control means to ensure that the fluid pressure booster produces the output, though it will not boost the input when the fluid pressure falls. The fluid pressure booster therefore becomes quite simple in construction because it is only needed to arrange the working piston and the control means in series.

In the fluid pressure booster according to the third and fourth aspects of the invention, the stroke control means provided between the control means and the input means makes it possible to set the stroke of the input means to various sizes. In this case, the stroke of the input means can simply be set to various sizes only by varying the spring constant of the spring because the stroke control means is provided with a spring according to the fourth aspect of the invention.

In the brake system according to the sixth aspect of the invention, the stroke of the brake operating member such as the brake pedal can also be set at an extra short stroke since the stroke of the input means of the fluid pressure booster is made an extra short stroke.

Moreover, due to the stroke control means provided between the control means and the input means, the stroke of the brake operating member is activated with the output of the fluid pressure booster, whereby the stroke thereof is freely set, regardless of the forward brake system from the master cylinder for producing the brake pressure.

DETAILED DESCRIPTION OF THE PREFERRED EMBODIMENTS

Now, a description will be given in more detail of preferred embodiments of the invention with reference to the accompanying drawings.

Figure 1:
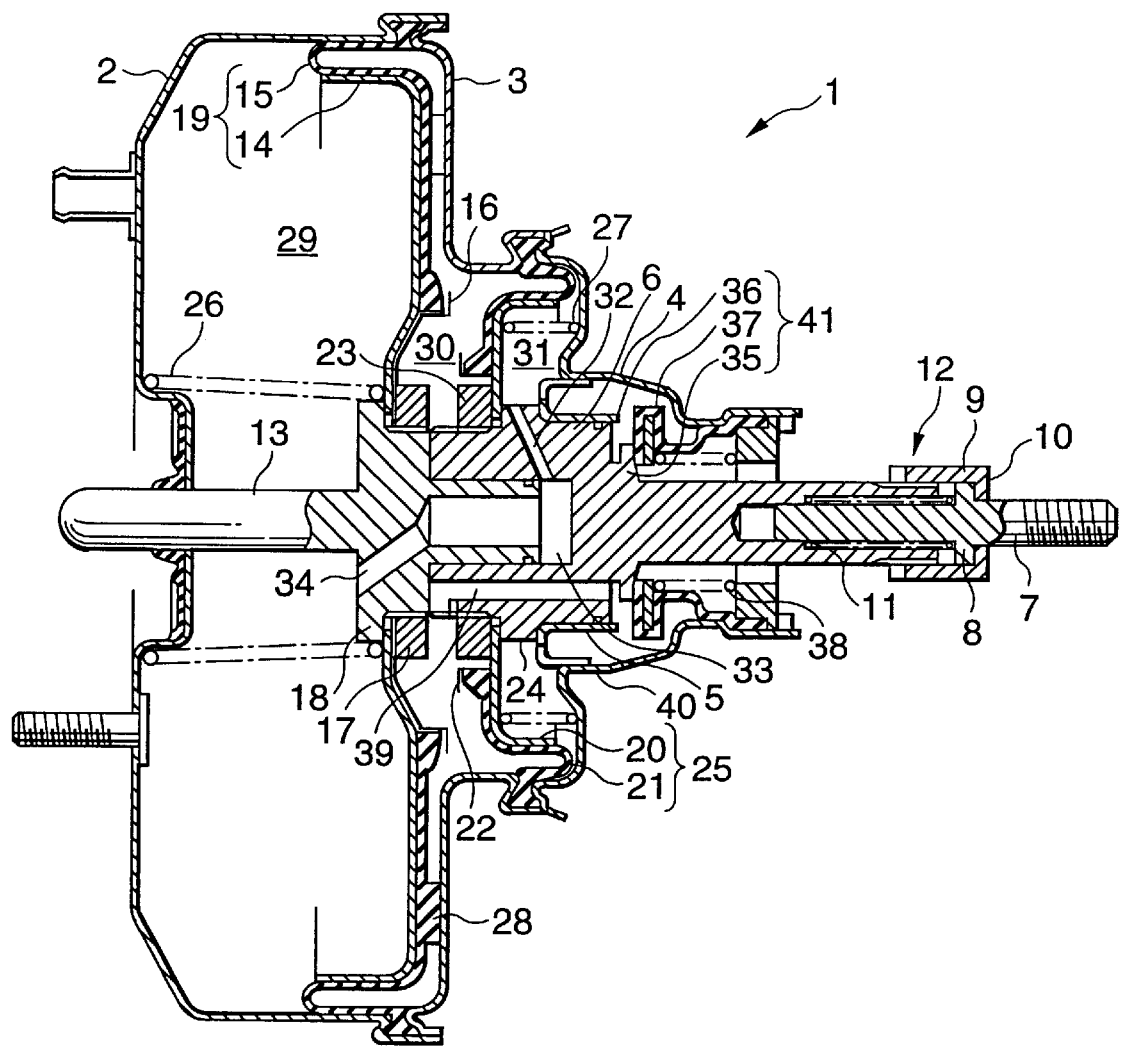
FIG. 1 is a sectional view of an exemplary negative pressure as a fluid pressure booster embodying the present invention.
Figure 10:
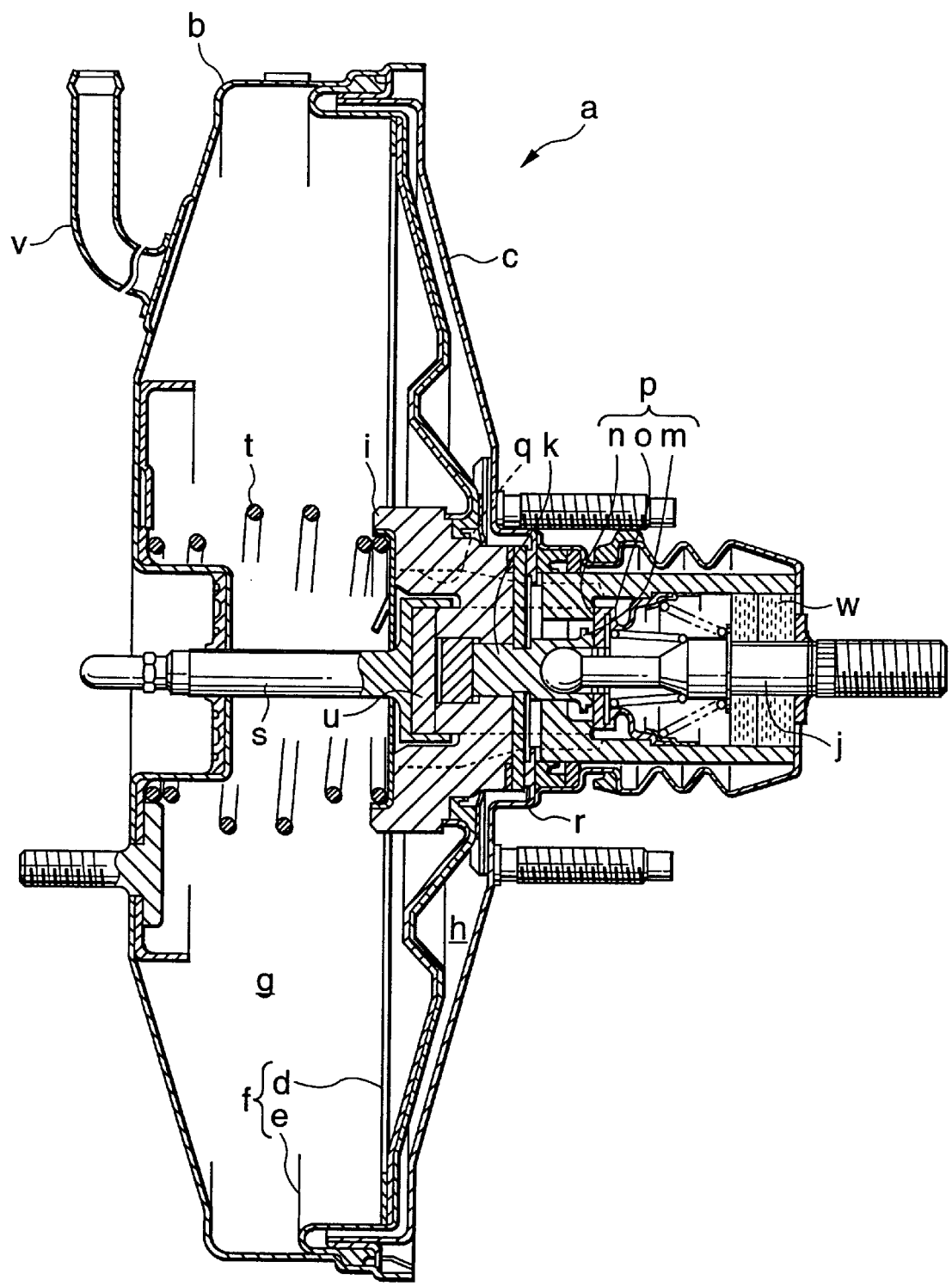
FIG. 10 is a sectional view of a conventional negative pressure booster.

FIG. 1 is a sectional view of an exemplary negative pressure as a fluid pressure booster embodying the present invention similar to what is shown in FIG. 10.

As shown in FIG. 1, the fluid pressure booster according to this embodiment is a negative pressure booster 1 used for boosting an input using negative pressure like the negative pressure booster shown in FIG. 10. The negative pressure booster 1 is provided with a first shell 2, a second shell 3 bayonet-coupled to the first shell 2 and a third shell 4 bayonet-coupled to the second shell 3, these first-third shells 2, 3 and 4 constitute a housing according to the present invention.

A cylindrical valve seat member 5 is fixed to the third shell 4, and a valve member 6 is airtightly and slidably passed through the valve seat member 5. Further, the leading end portion of an input rod 7 equivalent to an input means of the invention is slidably fitted in the rear end portion (right end portion in FIG. 1) of the valve member 6, and a flange 8 is formed on the outer peripheral face of the input rod 7. The flange 8 can be brought into contact with the rear end of the valve member 6. A brake pedal (not shown) is coupled to the rear end portion of the input rod 7 as in the conventional negative pressure booster.

A cylindrical nut member 9 is screwed into the outer peripheral portion of the rear end of the valve member 6 and also passed through the input rod 7 movably relative to the input rod 7. A flange 10 is also formed in the inner peripheral portion of the rear end of the cylindrical nut member 9, and the flange 8 of the input rod 7 and the flange 10 of the cylindrical nut member 9 are allowed to engage with each other in the direction in which the input rod 7 moves back (in the right direction of FIG. 1). Consequently, the input rod 7 is capable of movement relative to the valve member 6 between the front limit position where the flange 8 contacts the rear end of the valve member 6 and the rear limit position where the flange 8 engages with the flange 10. A spring 11 is provided compressively disposed between the valve member 6 and the input rod 7, which is always urged backward by the spring force of the spring 11 with respect to the valve member 6, and the flange 8 remains in the rear limit position where the flanges 8 and 10 engage with each other during the non-operation of the negative pressure booster 1. The valve member 6, the input rod 7 and the spring 11 is provided compressively between the valve member 6 and the input rod 7 constitute a stroke control means 12 for controlling the stroke of the input rod 7.

The rear end portion of an output rod 13 is airtightly and slidably fitted in the inner peripheral portion of the front end of the valve member 6, and the front end portion of the output rod 13 is airtightly passed through the first shell 2 so as to operate a master cylinder (hereinafter called the MCY) as in any one of the general conventional negative pressure boosters.

A piston member 14 is airtightly fitted in the output rod 13, and a flexible diaphragm piston 15 is disposed in the rear of this piston member 14, and the inner peripheral edge portion of the diaphragm piston 15 is supported by a support member 16. Further, the inner peripheral edge portions of the piston member 14 and support member 16 are provided between the nut 17 screwed into the output rod 13 and the flange 18 of the output rod 13, and the outer peripheral edge portion of the diaphragm piston 15 is airtightly held between the first and second shells 2 and 3. The piston member 14 and diaphragm piston 15 constitute a power piston 19 equivalent to a working piston according to the present invention.

On the other hand, a piston member 20 is airtightly fitted in the valve member 6, and a flexible diaphragm piston 21 is disposed in front of the piston member 20, the inner peripheral edge portion of the diaphragm piston 21 being supported by a support member 22. Further, the inner peripheral edge portions of the piston member 20 and support member 22 are provided between the nut 23 screwed into the valve member 6 and the flange 24 of the valve member 6, and the outer peripheral edge portion of the diaphragm piston 21 is airtightly held between the second and third shells 3 and 4. The piston member 20 and the diaphragm piston 21 constitute a control piston 25.

A return spring 26 is provided compressively between the first shell 2 and the power piston 19, and the power piston 19 and the output rod 13 are always urged backward by the spring force of the return spring 26. A controlling return spring 27 is provided compressively between the third shell 4 and the control piston 25, and the control piston 25 and the valve member 6 are always urged forward by the spring force of the controlling return spring 27. During the non-operation of the negative pressure booster 1, further, the valve member 6 and the output rod 13 are axially (in the lateral direction of FIG. 1) brought into contact with each other and the projected portion 28 of the diaphragm piston 15 is also brought into contact with the second shell 3, so that the valve member 6, the output rod 13, the power piston 19 and the control piston 25 are set in the rear limit position shown in FIG. 1.

In the first to third shells 2, 3 and 4 and the valve seat member 5, there are a first vacuum chamber 29 partitioned with the first shell 2 and the power piston 19; a working pressure chamber 30 partitioned with the second shell 3, the power piston 19 and the control piston 25; and a second vacuum chamber 31 partitioned with the valve seat member 5, the third shell 4 and the control piston 25. The first vacuum chamber 29 is connected to the intake manifold of, for example, an engine as in any one of the general conventional negative pressure boosters in order to introduce negative pressure therein at all times. The second vacuum chamber 31 always communicates with the first vacuum chamber 29 via a passage hole 32 formed in the valve member 6, a space 33 between the valve member 6 and the output rod 13, and a passage hole 34 formed in the output rod 13.

An atmospheric valve seat 35 is formed in the valve member 6, and a vacuum valve seat 36 is also formed in the valve seat member 5. In the third shell 4, further, there is provided a cylindrical control valve disc 37 that can be seated on the first and the vacuum valve seat 35 and 36. The control valve disc 37 is always urged by the spring force of a valve seat spring 38 toward the first and vacuum valve seat 35 and 36. While the control valve disc 37 is seated on the atmospheric valve seat 35 and separated from the vacuum valve seat 36, the working pressure chamber 30 communicates with the second vacuum chamber 31 via the passage hole 39 bored in the valve member 6, the gap between the control valve disc 37 and the vacuum valve seat 36, and a cutout groove 40 formed in the valve seat member 5. The working pressure chamber 30 further communicates with the first vacuum chamber 29 from the second vacuum chamber 31 as stated above and then with a vacuum source, so that it is cut off the atmosphere. While the control valve disc 37 is seated on the vacuum valve seat 36 and separated from the atmospheric valve seat 35, further, the working pressure chamber 30 communicates with the atmosphere via the passage hole 39 bored in the valve member 6, the gap between the control valve disc 37 and the atmospheric valve seat 35, and the space between the outer peripheral face of the valve member 6 and the inner peripheral face of the control valve disc 37, so that it is cut off the first and second vacuum chambers 29 and 31.

The valve member 6 stays at the rear limit position during the non-operation and since the control valve disc 37 is seated on the atmospheric valve seat 35 but separated from the vacuum valve seat 36, the working pressure chamber 30 communicates with the first and second vacuum chambers 29 and 31 and is cut off from the atmosphere. Thus, the first and vacuum valve seats 35 and 36 and the control valve disc 37 constitute a control valve 41 for controlling the switching of the processes including communicating the working pressure chamber 30 with the second vacuum chamber 31 or the atmosphere or cutting the working pressure chamber off the atmosphere. Further, the valve seat member 5, the valve member 6 and the control valve disc 37 also constitute a control means according to the present invention.

The operation of the negative pressure booster 1 according to this embodiment thus arranged will now be described.

During the non-operation of the negative pressure booster 1, each of the component members of the negative pressure booster 1 is in the condition shown in FIG. 1. As the working pressure chamber 30 is caused by the control valve 41 to communicate with the first and second vacuum chambers 29 and 31 and cut off from the atmosphere as stated above, the negative pressure has been introduced into the working pressure chamber 30, to say nothing of the first and second vacuum chambers 29 and 31. Therefore, the power piston 19 and the control piston 25 both stay at the non-operating position as illustrated and the negative pressure booster 1 will produce no output.

When the brake pedal is stepped on in order to actuate the brake, the input based on the force generated by stepping on the pedal is supplied to the input rod 7, which gives a forward stroke, thus pushing the valve member 6 via the spring 11. Then the valve member 6 also slides relative to the valve seat member 5 and gives a forward stroke. Consequently, the control valve disc 37 is seated on the vacuum valve seat 36, and the working pressure chamber 30 is cut off from the second vacuum chamber 31, whereby the introduction of the negative pressure into the working pressure chamber 30 is stopped. When the valve member 6 gives a forward stroke further, the atmospheric valve seat 35 is separated from the control valve disc 37, and the atmosphere is introduced into the working pressure chamber 30 via the gap between the atmospheric valve seat 35 and the control valve disc 37, and the passage hole 39. A pressure difference is then produced between the working pressure chamber 30 and the first vacuum chamber 29 and this pressure difference forwardly acts on the power piston 19. Accordingly, the power piston 19 operates to make the negative pressure booster 1 generate an output from the output rod 13. The output of the negative pressure booster 1 causes the MCY to generate the brake pressure because the output rod 13 pushes the piston of the MCY, and the brake is thus activated.

At this time, a pressure difference is also produced between the working pressure chamber 30 and the second vacuum chamber 31 due to the atmosphere introduced into the working pressure chamber 30 and backwardly acts on the control piston 25. Therefore, the valve member 6 stops giving the stroke any further, and the output shaft 13 (i.e., the power piston 19) is moved relative to the valve member 6 and gives a forward stroke. In other words, the input rod 7 gives the stroke to the extent that the valve member 6 switches the control valve 41 (the distance obtained from the sum of the gap between the second vacuum valve seat 36 and the control valve disc 37 during the non-operation and a predetermined quantity of gap between the first valve seat 35 and the control valve disc 37 necessary for the working pressure chamber 30 to obtain a predetermined pressure during the operation) but does not give any stroke exceeding the extent. When the pressure in the working pressure chamber 30 rises because of the atmosphere thus introduced and as the pressure thus raised increases the force of pushing the valve member 6 backward via the control piston 25, the valve member 6 moves back while contracting the spring 11. Then first valve seat 35 is seated on the control valve disc 37, and the working pressure chamber 30 is cut off from the atmosphere and the second vacuum chamber 31. Consequently, no more atmosphere is introduced into the working pressure chamber 30 and the pressure in the working pressure chamber 30 is reduced to what is proportional to the input supplied to the input rod 7. In other words, the control valve 41 controls the pressure in the working pressure chamber 30 so that the atmospheric force acting on the control piston 25 and the input of the input rod 7 may become balanced.

Thus, the negative pressure booster 1 starts to perform servo control for generating a great output equivalent to the force gained by stepping on the brake pedal.

At this time, the force produced from the aforementioned pressure difference acting on the control piston 25 is applied to the valve member 6, and this force is transmitted to the brake pedal as counterforce via the spring 11 and the input rod 7.

When stepping on the brake pedal is stopped in order to release the brake from its operating condition, the brake pedal is returned by the spring force of a pedal spring (not shown) to the non-operating condition as in the conventional negative pressure booster. Consequently, the input applied to the input rod 7 decreases and the input rod 7 is moved back together with the returning movement of the brake pedal, so that the input acting on the valve member also decreases. Then the valve member 6 also moves back by the atmospheric force in the working pressure chamber 30 acting on the control piston 25, and the first valve seat 35 moves the control valve disc 37 backward. Thus, the control valve disc 37 is separated from the second valve seat 36, whereby the atmosphere introduced into the working pressure chamber 30 is discharged toward the vacuum source via these second and first vacuum chambers 31 and 29 since the working pressure chamber 30 communicates with the vacuum source via the second and first vacuum chambers 31 and 29 as stated above. As a result, the pressure in the working pressure chamber 30 decreases and the power piston 19 and the output rod 13 both are moved back by the spring force of the return spring 26 and returned to the non-operating position. The negative pressure booster 1 then ceases producing the output and therefore the piston of the MCY moves to the non-operating position, thus stopping to producing the brake pressure whereby to release the brake.

When the negative pressure in the negative pressure source falls, no negative pressure is introduced into the first and second working pressure chambers 29 and 32, and these first and second working pressure chambers 29 and 32 are filled with the atmosphere. When the valve member 6 is stroked forward by stepping on the brake pedal as stated above in order to switch over the control valve 41, no pressure difference occurs between the working pressure chamber 30 and the first and second working pressure chambers 29 and 32. Therefore, the power piston 19 will not operate and the negative pressure booster 1 produces no output. However, the flange 8 of the input rod 7 is brought into contact with the rear end of the valve member 6 when the brake pedal is stepped on and the input rod 7, the valve member 6 and the output rod 13 are integrally stroked forward, so that the piston of the MCY is directly pushed by the input resulting from the pedal stepping force applied to the input rod 7. Therefore, the MCY produces the brake pressure to ensure that the brake is actuated even when the negative pressure falls.

In the negative pressure booster 1 according to this embodiment during the operation, the stroke of the valve member 6 is regulated by the pressure difference between the working pressure chamber 30 and the second vacuum chamber 31 via the control piston 25, and the power piston 19 and the output rod 13 are only stroked, so that the stroke of the valve member 6 becomes considerably smaller than the stroke of the valve conventional body with respect to the same output of the negative pressure booster 1. The regulation of the stroke of the valve member 6 is determined by the pressure-receiving area of the control piston 25 and the spring force of the controlling return spring 27. Since the valve seat member 5 is fixed to the third shell 4, further, the second valve seat 36 stays unmoved during the operation and it is only required for the valve member 6 to give a stroke to that extent that the first valve seat 35 forms a predetermined amount of gap from the control valve disc 37 seated on the second valve seat 36 during the operation. In other words, it is only required for the valve member 6 to give the stroke only by the distance as the sum of the gap between the second valve seat 36 and the control valve disc 37 during the non-operation and the aforementioned predetermined amount of gap during the operation with respect to the second valve seat 36 staying unmoved. The stroke of the valve member 6 is greatly shortened further than the stroke of the conventional valve body whose second valve seat is moved forward during the operation. Therefore, the stroke of the input rod 7 is made greatly smaller than the stroke of the conventional input rod 7 with respect to the same output of the negative pressure booster 1. In other words, the brake pedal is greatly shortened further than the conventional brake pedal (e.g., the stroke is shortened to 10 mm or less).

Figure 2A:
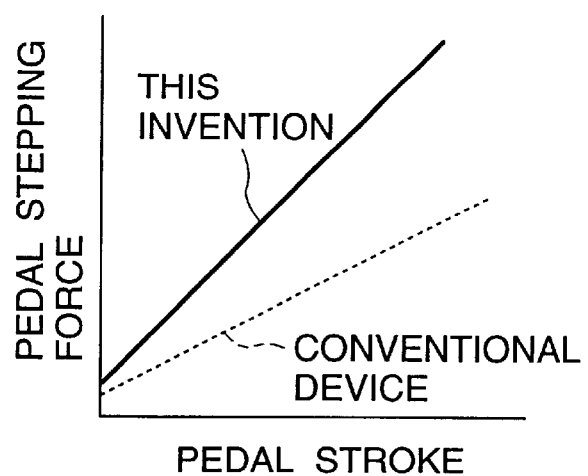
FIGS. 2A to 2C are haracteristic diagrams of the negative pressure booster shown in FIG. 1.
Figure 2B:
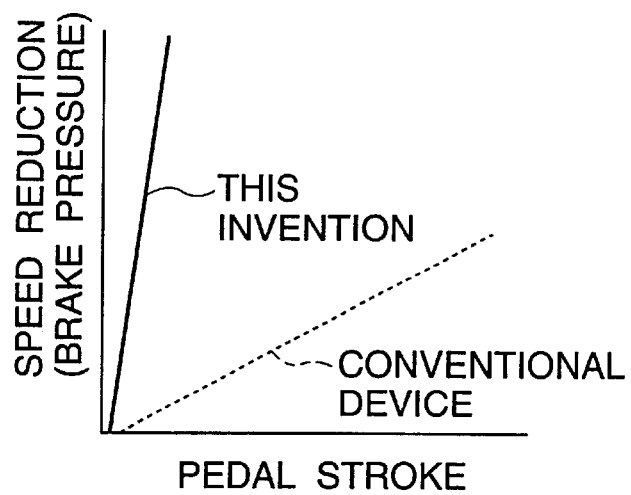
Figure 2C:
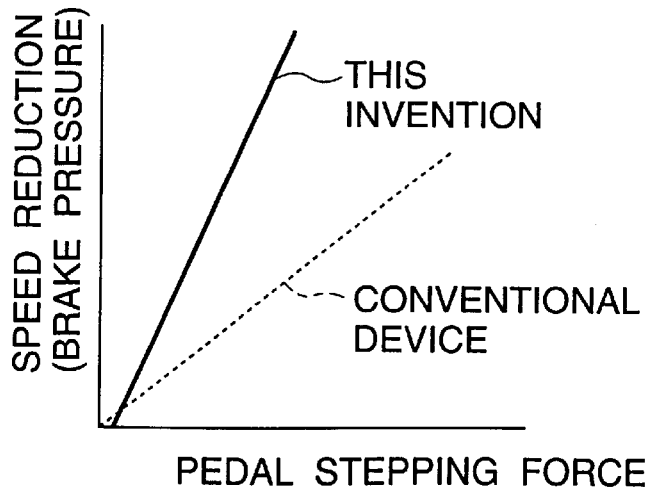

Thus, the brake pedal is made considerably smaller than the conventional brake pedal with respect to the same pedal stepping force. As shown in FIGS. 2A to 2C, there are obtainable characteristics of the pedal stepping force with respect to the pedal stroke, those of speed reduction (i.e., the brake pressure or the output of the negative pressure booster 1) with respect to the pedal stroke, and those of speed reduction (i.e., the brake pressure or the output of the negative pressure booster 1) with respect to the pedal stepping force.

As the spring 11 of the stroke control means 12 provided between the input rod 7 and the valve member 6 is compressed by the input of the input rod 7 during the operation, the stroke of the input rod 7 is increased excessively to an extent greater than that of the valve member 6 that the spring 11 has been compressed. In other words, the stroke of the input rod 7, that is, the pedal stroke of the brake pedal varies with the preset spring constant of the spring 11. Therefore, the pedal stroke is freely set up by optionally setting the spring constant of the spring 11 in the stroke control means 12.

As the pedal stroke is thus determined by the spring constant of the spring 11, the brake system (not shown) ahead of the MCY has nothing to do with the pedal stroke. More specifically, even though the piston stroke of the MCY increases, for example, an increase in the piston stroke will result in simply increasing the amount of atmosphere introduced into the working pressure chamber 30 in proportion to an increase in the stroke of the power piston 19 of the negative pressure booster 1, and the pedal stroke will never increase.

As the stroke of the input rod 7 is increased to an extent greater than that of the valve member 6 that the spring 11 has been compressed, the total stroke of the input rod 7 is greatly reduced in comparison with the stroke of the input rod 7 in the conventional negative pressure booster 1 because the increased amount is far smaller than the greatly reduced amount of the stroke of the valve member 6.

Consequently, the input rod 7 in the negative pressure booster 1 according to this embodiment is stroked only by the stroke amount required for switching the control valve 41 over and as the pedal stroke can freely be set using the stroke control means 12, regardless of the brake system ahead of the MCY, so that the negative pressure booster gives almost no stroke but an extra short stroke during the operation.

Figure 3:
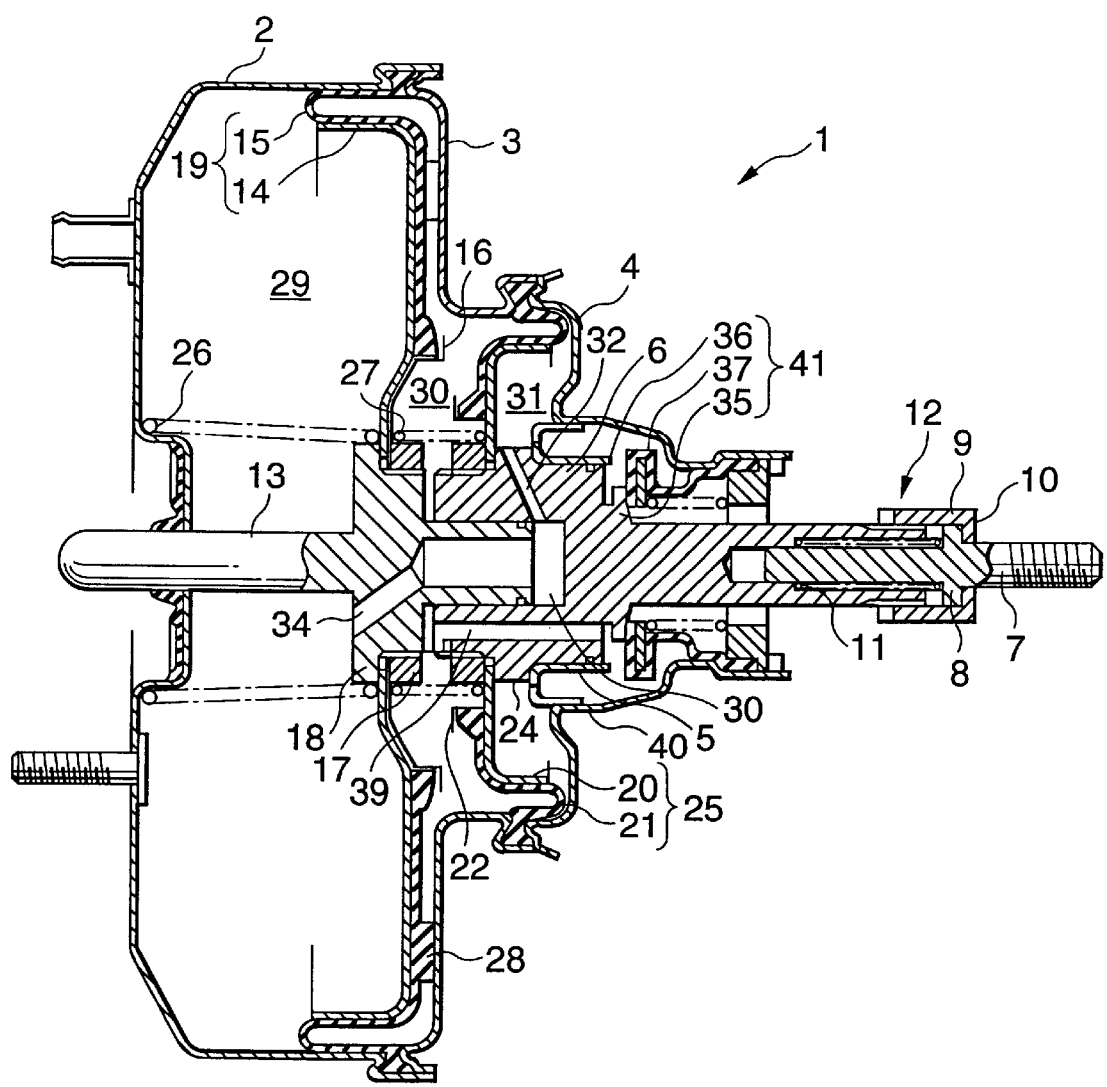
FIG. 3 is a sectional view of another embodiment of the negative pressure booster according to the present invention in the form of a sectional view similar to FIG. 1.

FIG. 3 shows another embodiment of the invention in the form of a sectional view like FIG. 1, wherein like reference numerals designate like component elements of FIG. 1 and the detailed description thereof will be omitted.

In the aforementioned embodiment of FIG. 1, the controlling return spring 27 is disposed between the control piston 25 and the third shell 4, and the valve member 6 and the output rod 13 are axially brought into contact with each other by the spring force of the controlling return spring 27 during the non-operation but separated from the valve seat member 5 fixed to the third shell 4. In the negative pressure booster 1 according to this embodiment, the controlling return spring 27 is arranged between the power piston 19 and the control piston 25 as shown in FIG. 3. Further, the valve member 6 is axially separated from the output rod 13 but brought into contact with the valve seat member 5 during the non-operation.

The rest of the arrangement of the negative pressure booster according to this embodiment is similar to what is shown in FIG. 1.

Subsequently, the operation/working-effect of the negative pressure booster according to this embodiment will be described.

In the embodiment shown in FIG. 1, the valve member 6, the power piston 19 and the output rod 13 together give a stroke with respect to forward stroke of the input rod 7 before the boosting is started at the time of starting the operation, whereas in the negative pressure booster 1 according to this embodiment, the power piston 19 and the output rod 13 both give no stroke and are held at the non-operating position but only the valve member 6 gives a stroke with respect to the forward stroke of the input rod 7 before the boosting is started at the time of starting the operation. Consequently, as it is unnecessary to move the large power piston 19 and the output rod 13 in the negative pressure booster 1 according to this embodiment before the boosting is started, a pedal feeling before the start of the operation is improved better than that in the embodiment shown in FIG. 1.

The rest of the operation/working-effect of the negative pressure booster according to this embodiment are similar to those referred to in FIG. 1.

Figure 4:
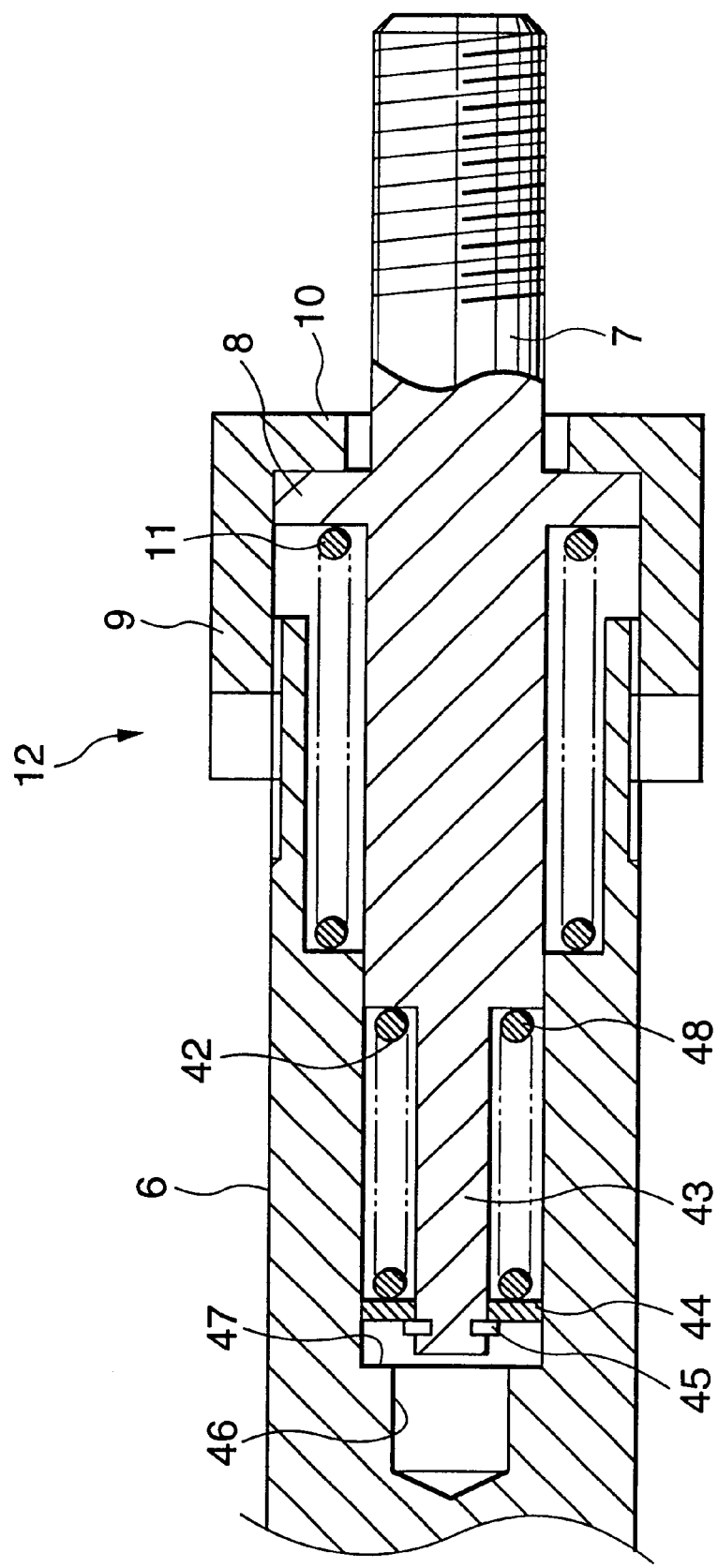
FIG. 4 is a diagram showing still another embodiment of the invention.

FIG. 4 shows still another embodiment of the invention in the form of a sectional view like FIG. 1, wherein like reference numerals designate like component elements of FIG. 1 and the detailed description thereof will be omitted.

Although only one spring 11 is provided compressively between the valve member 6 and the input rod 7 in the stroke control means 12 according to the aforementioned embodiments shown in FIGS. 1 and 3, another spring 42 in addition to the spring 11 is provided compressively between the valve member 6 and the input rod 7 in the stroke control means 12 of the negative pressure booster 1 according to this embodiment.

More specifically, a compressed diameter portion 43 is formed in the front end portion of the input rod 7 slidably fitted in the valve member 6, and an annular disc-like retainer 44 is slidably fitted in the compressed diameter portion 43 in the stroke control means 12 according to this embodiment. In this case, the retainer 44 is restricted by a stopper ring 45 fitted to the compressed diameter portion 43 to moving forward beyond the input rod 7 (leftward in FIG. 4).

Further, a compressed diameter hole 46 is provided continuously to the hole of the valve member 6 in which the front end portion of the input rod 7 is fitted and a stepped portion 47 is formed by this hole 46 in the valve member 6. When the input rod 6 is stroked forward, though the compressed diameter portion 43 of the input rod 7 and the output rod 45 are allowed to enter the hole 46, the retainer 44 is not allowed to enter the hole 46 as it is brought into contact with the stepped portion 47. The aforementioned spring 42 is disposed between the stepped portion 48 of the input rod 7 because of the compressed diameter portion 43 and the retainer 44, and compressed so that a predetermined spring force can be produced between the stepped portion 48 and the retainer 44 in contact with the stopper ring 45 during the non-operation as shown in FIG. 4. Further, a predetermined space is set between the retainer 44 and the stepped portion 47 during the non-operation.

The rest of the arrangement of the negative pressure booster according to this embodiment is similar to those referred to in FIG. 1 or 2.

Figure 5A:
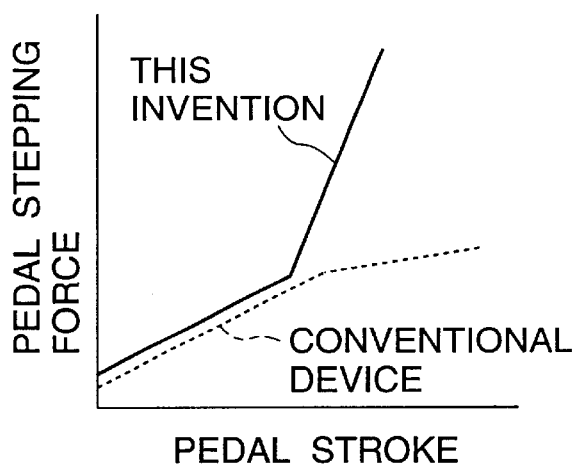
FIGS. 5A to 5C are characteristic diagrams of the liquid pressure booster shown in FIG. 4.
Figure 5B:
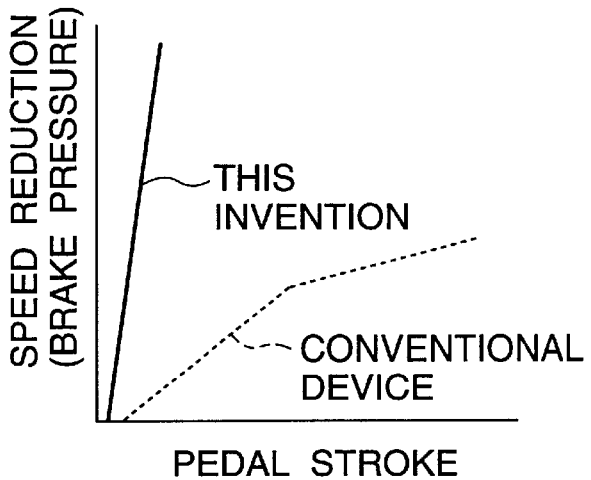
Figure 5C:
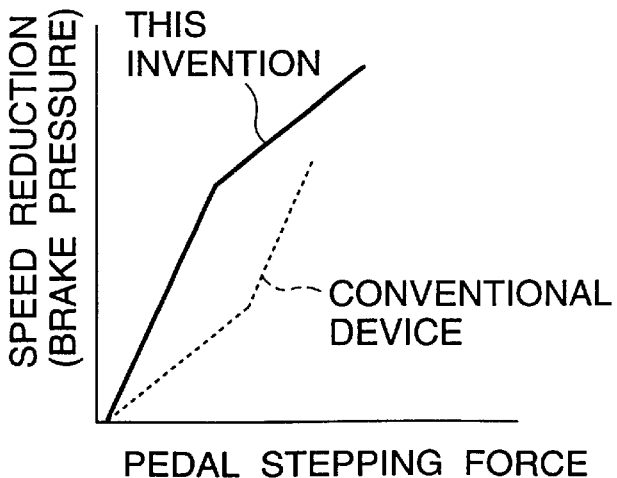

In the stroke control means 12 of the negative pressure booster according to this embodiment thus arranged, the spring 11 is first moved forward while being compressed by the input rod 7 giving a stroke forward during the operation. At this time, the retainer 44 is also moved forward since the predetermined space has been set between the retainer 44 and the stepped portion 47. When the stopper ring 45 enters the hole 46 and when the retainer 44 contacts the stepped portion, the retainer 44 stops to move forward. Therefore, the input rod 7 is moved forward while compressing the spring 42 in addition to the spring 11, whereby the spring constant of the stroke control means changes and comes to exhibit two-stage characteristics about the pedal-stepping force against the pedal stroke and the speed reduction (brake pressure) thus produced. In this case, the characteristics of the pedal stepping force against the pedal stroke, those of the speed reduction (brake pressure) against the pedal stroke and those of the speed reduction (brake pressure) against the pedal stepping force become as shown in FIGS. 5A to 5C.

From the negative pressure booster 1 according to this embodiment, various characteristics are made obtainable by properly setting the spring constants of the springs 11 and 42, a combination of various springs, the space between the retainer 44 and the stepped portion 47 and the like.

Figure 6:
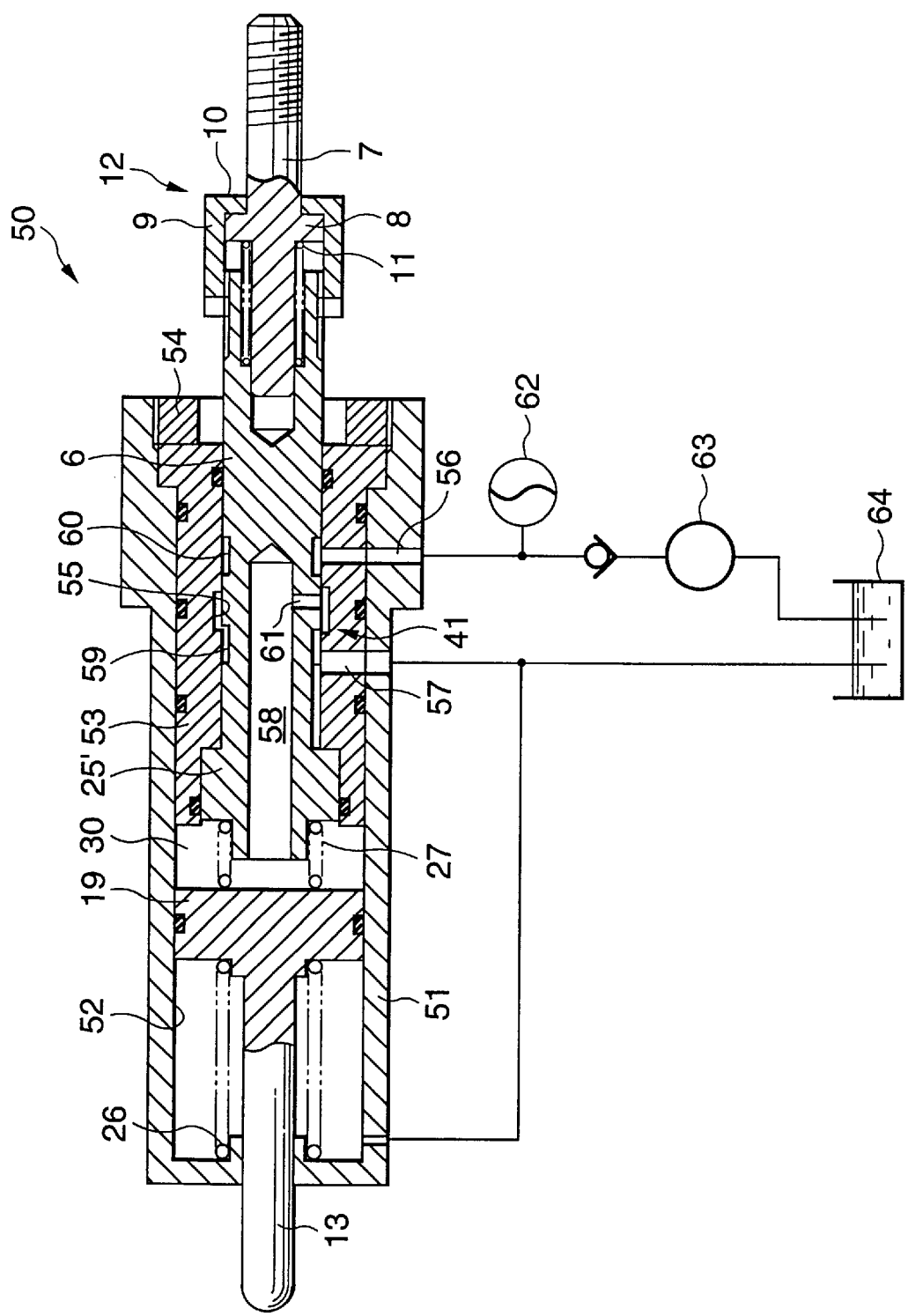
FIG. 6 is a sectional view of another embodiment of the liquid pressure booster according to the present invention.

FIG. 6 shows still another exemplary fluid pressure booster embodying the invention in the form of a sectional view, wherein like reference numerals designate like component elements in the preceding embodiments thereof and the detailed description thereof will be omitted.

Although the negative pressure booster 1 has been applied to the fluid pressure boosters according to the preceding embodiments of the invention, the fluid pressure booster according to this embodiment is a liquid pressure booster 50 for boosting an input using a liquid pressure as shown in FIG. 6. The liquid pressure booster according to this embodiment is a closed-center type liquid pressure booster having a housing 51 whose stepped hole 52 contains the power piston 19 liquid-tightly and slidably provided therein and the output rod 13 integrally formed with the power piston 19. Further, a cylindrical member 53 is liquid-tightly fitted to the rear end side of the stepped hole 52 of the housing 51 and stopped from moving axially by a nut 54.

A first annular groove 55 is provided in the inner peripheral face of the inner hole of the cylindrical member 53, and a supply hole 56 and a discharge hole 57 extending from the outer surface of the housing 51 up to the inner peripheral face of the inner hole of the cylindrical member 53 are respectively bored in the housing 51 and the cylindrical member 53.

The valve member 6 is slidably fitted in the inner hole of the cylindrical member 53. An axial hole 58 opening at its front end is bored on the front side of the valve member 6, and a second and a third annular groove 59 and 60 are formed in the outer peripheral face of the valve member 6. Further, a diametric hole 61 extending from the outer peripheral face of the valve member 6 toward the inner peripheral face of the axial hole 58 is bored in the valve member 6. A control piston 25' is also provided in the front end portion of the valve member 6, and the controlling return spring 27 is provided compressively between the control piston 25 and the power piston 19. The stroke control means 12 is provided likewise as in the aforementioned embodiments of the invention.

The working pressure chamber 30 for receiving pressurized liquid as a working fluid is provided between the power piston 19 and the control piston 25'. In this case, communicating or cutting the working pressure chamber 30 with or off the supply hole 56 or discharge hole 57 is selectively chosen under control by selecting communicating the first annular groove 55 of the cylindrical member 53 with the second or third annular groove 59 or 60 of the valve member 6. In other words, the first to third annular grooves 55, 59 and 60 constitute the control valve 41. In this case, the first annular groove 55 communicates with the second annular groove 59 but is cut off the third annular groove 30 during the non-operation.

The supply hole 56 is connected to an accumulator 62, and a predetermined liquid pressure is stored in the accumulator 62 by the working liquid in a reservoir 64 discharged from a pump 63. Consequently, the stored pressure in the accumulator 62 is always introduced into the supply hole 56, whereas the discharge hole 57 is always connected to the reservoir 64.

Although the rest of the arrangement of the liquid pressure booster 50 is different in specific construction from the negative pressure booster 1 in the preceding embodiments, both the boosters are functionally similar.

In the liquid pressure booster 50 thus arranged, the first annular groove 55 communicates with the second annular groove 59 and is cut off the third annular groove 60 during the non-operation as shown in FIG. 6, whereupon the working pressure chamber 30 communicates with the reservoir 64 via the axial hole 58, the diametric hole 61, the first annular groove 55, the third annular groove 59 and the discharge hole 57 and is cut off from the supply hole 56. Consequently, no pressurized liquid is introduced from the supply hole 56 into the working pressure chamber 30, and the power piston 19 stays in the non-operating position, so that the liquid pressure booster 50 produces no output. In this case, since the controlling return spring 27 is provided compressively between the power piston 19 and the control piston 25' as in the embodiment referred to FIG. 3, the rear end of the power piston 19 is separated from the front end of the valve member 6.

When the brake is actuated by stepping on a brake pedal (not shown), the input rod 7 is stroked forward while compressing the spring 11 as in the aforementioned preceding embodiments and transfers the input applied to the input rod 7 to the valve member 6. Then the valve member 6 is moved forward and the second annular groove 59 is cut off from the first annular groove 55, and the third annular groove 60 is caused to communicate with the first annular groove 55. Further, the pressurized liquid introduced into the supply hole 56 is introduced into the working pressure chamber 30 via the supply hole 56, the third annular groove 60, the first annular groove 55, the diametric hole 61 and the axial hole 58, whereby the power piston 19 is operated and the liquid pressure booster 50 produces an output from the output rod 13. With this output, MCY (not shown) is operated to produce the brake pressure so as to actuate the brake.

On the other hand, as the liquid pressure of the pressurized liquid introduced into the working pressure chamber 30 also acts on the control piston 25' as in the aforementioned embodiment (wherein the atmospheric pressure acts on the control piston 25), the valve member 6 ceases giving a stroke further, so that power piston 19 and the output rod 13 are only moved forward. In other words, even in the liquid pressure booster 50 according to this embodiment, the input rod 7 is stroked to the extent that the valve member 6 switches the control valve 41 over and not stroked further (the distance required for the first annular groove 55 to communicate with the third annular groove 60 after being cut off the second annular groove 59 to a degree necessary for obtaining a predetermined pressure for the working pressure chamber 30). As the pressure in the working pressure chamber 30 rises because of the pressurized liquid introduced and when the raised pressure becomes great enough to push the valve member 6 backward via the control piston 25', the valve member 6 moves back while compressing the spring 11. Then the third annular groove 60 is cut off from the first annular groove 55, and the working pressure chamber 30 is also cut off from both the supply hole 56 and the discharge hole 57. Therefore, the pressurized liquid is not introduced into the working pressure chamber 30 further and the pressure in the working pressure chamber 30 becomes equal to a pressure corresponding to the input applied to the input rod 7. In other words, the control valve 41 controls the pressure in the working pressure chamber 30 so that the force resulting from the pressurized liquid acting on the control piston 25' and the input of the input rod 7 may be balanced.

In order to release the brake from its operating condition, the input rod 7 is moved back as in the conventional liquid pressure booster and as in the aforementioned preceding embodiments when the brake pedal is released and the input acting on the valve member also becomes lowered. Then the force of the pressurized liquid in the working pressure chamber 30 causes the valve member 6 to move back and further the first and second annular grooves 55 and 59 to communicate with each other, whereby the pressurized liquid introduced into the working pressure chamber 30 is discharged into the reservoir 64. Moreover, the power piston 19 and the output rod 13 both are moved back by the spring force of the return spring 26, and the non-operating position is restored, so that the liquid pressure booster 50 ceases producing the output. Consequently, the piston of the MCY returns to the non-operating position and the MCY stops producing the brake pressure, thus releasing the brake.

In case the liquid pressure sources such as the accumulator 62, the pump 63 and the like malfunction, no liquid pressure is introduced into the supply hole 56. When the brake pedal is stepped on then as stated above, the valve member 6 is stroked forward and even though the control valve 41 is switched over, the liquid pressure is not introduced into the working pressure chamber 30. Consequently, the power piston 19 ceases operating and the liquid pressure booster 30 also stops producing the output. However, as the flange 8 of the input rod 7 is brought into contact with the rear end of the valve member 6 and the front end of the valve member 6 is also brought into contact with the power piston 19 as in the aforementioned preceding embodiments by stepping on the brake pedal, the input because of the pedal stepping force applied to the input rod 7 is caused to directly push the piston of the MCY. Accordingly, the MCY produces the brake pressure to ensure that the brake is operated even when the liquid pressure falls.

The rest of the operation/working-effect of the liquid pressure booster 50 according to this embodiment are similar to those referred to in FIG. 4 and the respective characteristics of the liquid pressure booster 50 are similar to those referred to in FIGS. 5A to 5C.

Figure 7:
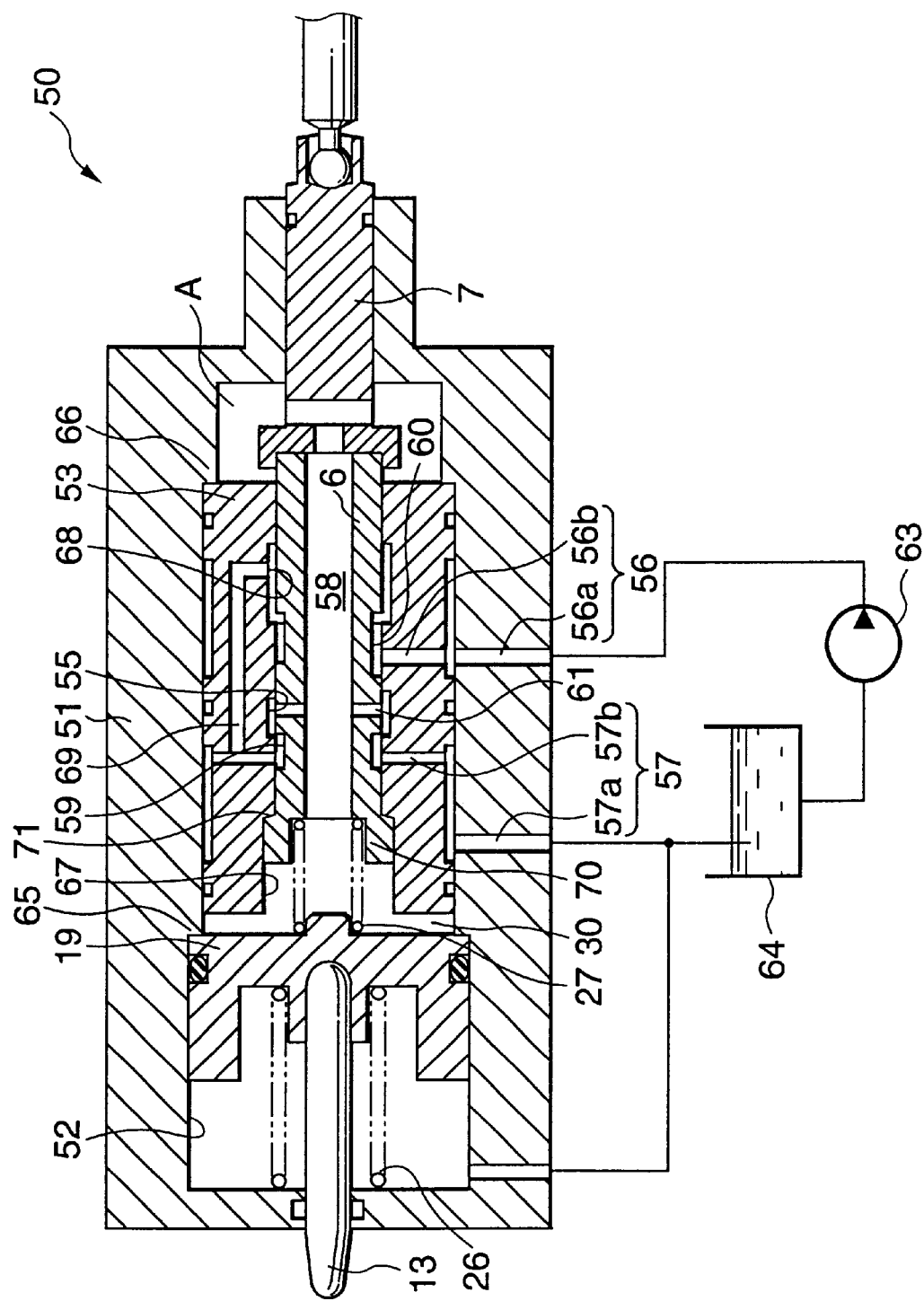
FIG. 7 is a sectional view of still another embodiment of the liquid pressure booster according to the present invention in the form of a sectional view.

FIG. 7 shows still another exemplary fluid pressure booster embodying the invention in the form of a sectional view, wherein like reference numerals designate like component elements in the preceding embodiments thereof and the detailed description thereof will be omitted.

Although the liquid pressure booster 50 shown in FIG. 6 is of the closed-center type, a liquid pressure booster 50 according to this embodiment is of an open-center type as shown in FIG. 7. Although the cylindrical member 53 is not axially movable in the liquid pressure booster 50 shown in FIG. 6, the cylindrical member 53 in the liquid pressure booster 50 according to this embodiment is set liquid-tightly slidable. Further, the power piston 19 can be brought into contact with the stepped portion 65 of the stepped hole 52. When the power piston 19 is brought into contact with the stepped portion 65, the power piston 19 is restricted to moving back further. Moreover, the cylindrical member 53 can also be brought into contact with the stepped portion 66 of the stepped hole 52. When the cylindrical member 53 is brought into contact with the stepped portion 66, the cylindrical member 53 is restricted to moving back further. When the cylindrical member 53 is moved forward relative to the power piston 19, the cylindrical member 53 is brought into contact with the power piston 19.

The supply hole 56 and the discharge hole 57 of the liquid pressure booster 50 according to this embodiment comprise bored portions 56a and 57a in the housing 51, and bored portions 56b and 57b in the cylindrical member 53, these portions 56b and 57b being axially movable relative to the portions 56a and 57a and communicating with the portions 56a and 57a, respectively.

Further, a fourth annular groove 68 in addition to the first annular groove 55 is provided in the inner peripheral face of the stepped hole 67 of the cylindrical member 53, and a passage hole 69 for always communicating the fourth annular groove 68 with the discharge hole 57 is also bored therein.

The axial hole 58 provided in the valve member 6 is a through-hole which is opened at both ends of the valve member 6. Moreover, a large diameter portion 70 in place of the control piston 25' of the liquid pressure booster 50 shown in FIG. 6 is provided to the front end portion of the valve member 6, which is restricted to moving back further by bringing the large diameter portion 70 into contact with the stepped portion 71 of the stepped hole 67 of the cylindrical member 53.

The input rod 7 is directly coupled to the rear end of the valve member 6 but the illustration of the stroke control means 12 in the aforementioned preceding embodiments has been omitted. This input rod 7 is coupled to a brake pedal (not shown) via a coupling rod 72.

When the fourth annular groove 68 of the cylindrical member 53 communicates with the third annular groove 60 of the valve member 6, the supply hole 56 is caused to communicate with the discharge hole 57 via the third annular groove 60, the fourth annular groove 68 and the passage hole 69. When the first annular groove 55 communicates with the third annular groove 60, further, the supply hole 56 communicates with the working pressure chamber 30 via the third annular groove 60, the first annular groove 55, the diametric hole 61 and the axial hole 58. When the first annular groove 55 and the second annular groove 59 communicate with each other, moreover, the discharge hole 57 communicates with the working pressure chamber 30 via the second annular groove 59, the first annular groove 55, the diametric hole 61 and the axial hole 58.

In this case, communicating or cutting the working pressure chamber 30 with or off from the supply hole 56 or discharge hole 57 is selectively chosen under control by selectively communicating each of the aforementioned annular grooves by sliding the valve member 6 relative to the cylindrical member 53. In other words, the first to fourth annular grooves 55, 59, 60 and 68 constitute a control valve for controlling supply and discharge of the pressurized liquid to and from the working pressure chamber 30.

In this case, the third annular groove 60 communicates with the fourth annular groove 68 but is cut off the first annular groove 55 during the non-operation as shown in FIG. 7, and the second annular groove 59 communicates with the first annular groove 55. Then the cylindrical member 53 including the control valve and the valve member 6 constitute a control means according to the present invention, and this control means is disposed in series with a predetermined space provided for the power piston 19.

The rest of the arrangement of the liquid pressure booster is similar to what referred to in FIG. 6.

The operation of the liquid pressure booster thus arranged according to this embodiment will subsequently be described.

As the third annular groove 60 communicates with the fourth annular groove 68 but is cut off the first annular groove 55 during the non-operation as shown in FIG. 7, the working liquid of the reservoir 64 discharged from the pump 63 and passed through the supply hole 56, the third annular groove 60, the fourth annular groove 68, the passage hole 69 and the discharge hole 57 is returned to the reservoir 64 again. At this time, no pressure is generated since the working fluid is not throttled. In other words, the working fluid of the reservoir 64 is passed through the liquid pressure booster 50 and returned to the reservoir 64 again after circulation. Since the second annular groove 59 communicates with the first annular groove 55, the working pressure chamber 30 is caused to communicate with the reservoir 64 via the axial hole 58, the diametric hole 61, the first annular groove 55, the second annular groove 59 and the discharge hole 57, so that no liquid pressure is introduced into the working pressure chamber 30. Therefore, the power piston 19 does not operate and produce the output.

The power piston 19 is held in the non-operating position where it is kept in contact with the stepped portion 65 by the spring force of the return spring 26 during the operation, in the non-operating position where the valve member 6 is kept in contact with the stepped portion 71 by the spring force of the controlling return spring 27, and in the non-operating position where the cylindrical member 53 is kept in contact with the stepped portion 66.

When the brake is actuated by stepping on the brake pedal, the input rod 7 is stroked forward while making the valve member 6 move forward. As the valve member 6 moves forward, the communication of the third annular groove 60 with the fourth annular groove 68 is gradually throttled and the first annular groove 55 is cut off the second annular groove 59, whereas the first annular groove 55 is caused to communicate with the third annular groove 60. When the communication of the fourth annular groove 68 with the third annular groove 60 is throttled, the liquid pressure is produced in the third annular groove 60, and this liquid pressure is introduced into the working pressure chamber 30 from the third annular groove 60 via the first annular groove 55, the diametric hole 61 and the axial hole 58. The liquid pressure thus introduced into the working pressure chamber 30 acts on the power piston 19, which operates to give a stroke forward and produces an output. The output of the power piston 19 causes the MCY (not shown) to operate via the output rod 13 and brake pressure to be produced. Thus, the brake is actuated.

At this time, the cylindrical member 53 is not stroked and held in the non-operating position shown in FIG. 7, whereby the valve member 6 is slightly stroked by the amount needed to switch cases of communicating the annular grooves with each other and cutting off their communication, whereas the input rod 7 is also slightly stroked. Therefore, the power piston 19 and the output rod 13 are only moved forward.

Since the liquid pressure introduced into the working pressure chamber 30 acts on the valve member 6, on the other hand, the valve member 6 is controlled so that the input due to the pedal stepping force transmitted via the input rod 7 and the force applied by the liquid pressure in the working pressure chamber 30 may be balanced and controlled so that the liquid pressure in the working pressure chamber 30 and the input applied by the pedal stepping force may be balanced.

Then the force produced by the liquid pressure in the working pressure chamber 30 is applied to the valve member 6, and this force is transferred to the brake pedal via the input rod 7 as counterforce. Although the communication of the third annular groove 60 with the fourth annular groove 68 is throttled, the third annular groove 60 may be cut off from the fourth annular groove 68.

When the brake pedal is released so as to release the brake, the valve member 6 is also moved back to the non-operating position as the input rod 7 is moved back to the non-operating position, and the third annular groove 60 is cut off from the first annular groove 55. Then the communication of the third annular groove 60 with the fourth annular groove 68 grows greater and the second annular groove 59 is caused to communicate with the first annular groove, whereby the working liquid discharged from the pump 63 is circulated through the reservoir 64 again without being throttled between the third and fourth annular grooves 60 and 68 as in the aforementioned non-operating condition. Since the working liquid is not throttled, no liquid pressure is produced in the third annular groove 60. As the pressurized liquid introduced into the working pressure chamber 30 is discharged into the reservoir 64 via the axial hole 58, the diametric hole 61, the first annular groove 55, the second annular groove 59 and the discharge hole 57, the power piston 19 returns to the non-operating position shown in FIG. 7. Thus, the liquid pressure booster 50 produces no output. The brake is thus released.

When the liquid pressure source such as the pump 63 falls, the power piston 19 is not operated by the liquid pressure because no liquid pressure is produced even though the control valve is switched over during the operation. When the brake pedal is stepped on further, the input rod 7 is moved forward further and the front end of the input rod 7 is brought into contact with the cylindrical member 53, so that the input rod 7 and the cylindrical member 53 are integrally moved forward. Then the cylindrical member is brought into contact with the power piston 19 and ultimately the input rod 7, the cylindrical member 53, the power piston 19 and the output rod 13 are also integrally moved forward. Thus, the MCY operates to produce the brake pressure to ensure that the brake is actuated even when the liquid pressure source falls.

With the forward movement of the cylindrical member 53, the capacity of a space A on the input rod side of the stepped hole 52 of the housing 51 increases. However, since the third annular groove 60 and the first annular groove 55 are communicating with each other, the working liquid of the reservoir 64 is supplied to the space A via the pump 63, the supply hole 56, the third annular groove 60, the first annular groove 55, the diametric hole 61 and the axial hole 58. Consequently, the cylindrical member 53 is allowed to move forward smoothly.

As the input rod 7 is moved back when the brake is released, the valve member 6 is moved back and the large diameter portion 70 is brought into contact with the stepped portion 71 of the cylindrical member 53 as shown in FIG. 7. Since the second and first annular grooves thereby communicate with each other again, the power piston 19 and the cylindrical member 53 return to the non-operating position shown in FIG. 7 while discharging the working liquid supplied to the space A into the reservoir 64 via the axial hole 58, the diametric hole 61, the first and second annular grooves 55 and 50, and the discharge hole 57.

The rest of the operation/working-effect of the liquid pressure booster 50 according to this embodiment are similar to those referred to in FIG. 6.

Even in the liquid pressure booster 50 according to this embodiment, the stroke control means 12 is needless to say provided. In this case, the input rod 7 is provided in such a way as to extend outside the housing during the non-operation, and the input rod 7 is divided into two in the extended portion, so that the stroke control means 12 may be provided therebetween.

Figure 8:
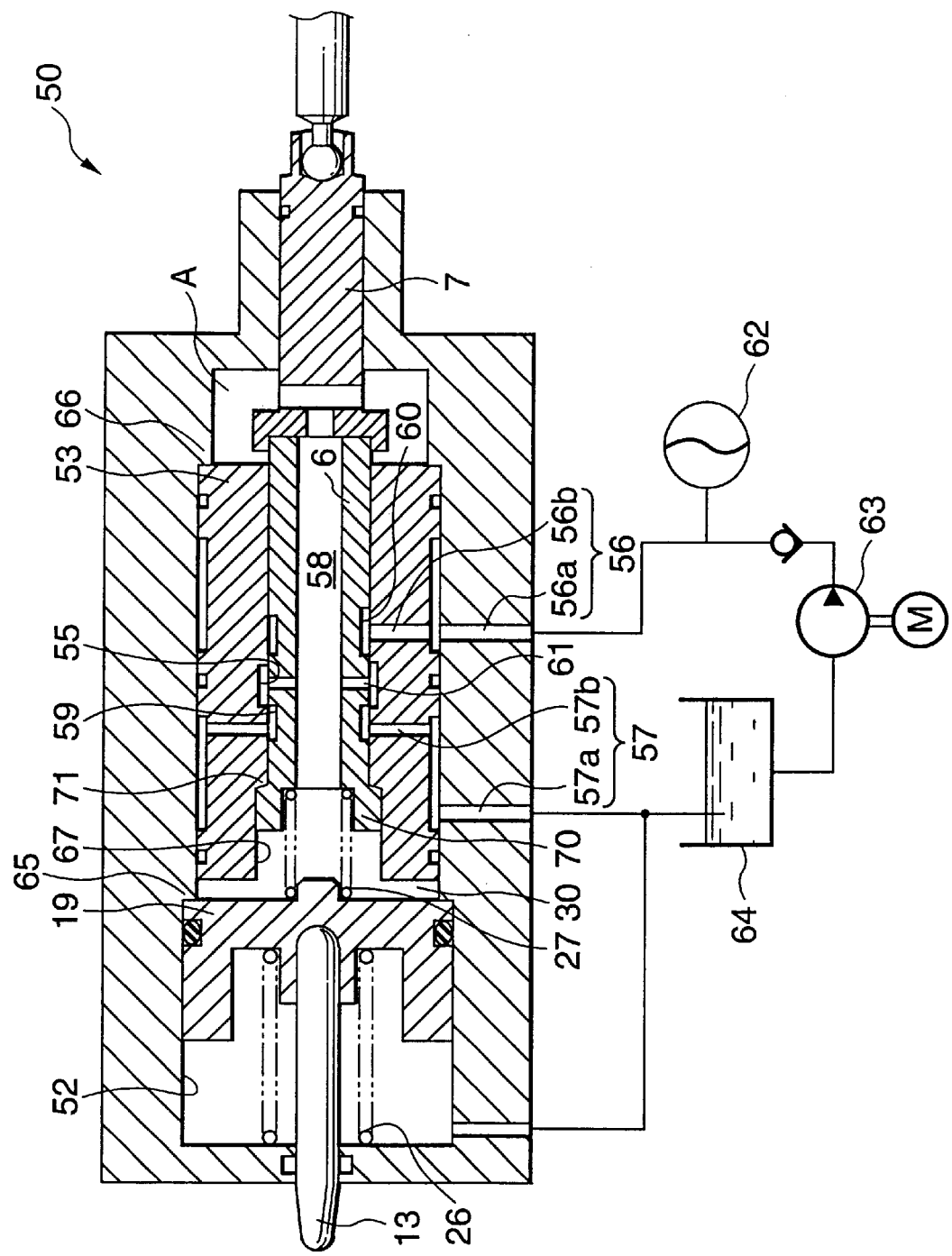
FIG. 8 is a sectional view of still another embodiment of the liquid pressure booster according to the present invention.

FIG. 8 shows still another exemplary fluid pressure booster embodying the invention in the form of a sectional view of FIG. 7, wherein like reference numerals designate like component elements in the preceding embodiments thereof and the detailed description thereof will be omitted.

Although the liquid pressure booster 50 shown in FIG. 7 is of the open center type liquid pressure booster, a liquid pressure booster 50 is, as shown in FIG. 8, a closed-center type liquid pressure booster similar to what is shown in FIG. 6. Therefore, an arrangement of the portion used to supply the liquid pressure to the working pressure chamber 30 is similar to the arrangement shown in FIG. 6 and the rest of the arrangement is also similar to what is shown in FIG. 7. More specifically, the illustration of the fourth annular groove 68 and the passage hole 69 is omitted as in the embodiment of FIG. 6 in the liquid pressure booster 50 shown in FIG. 7. However, the accumulator 62 is installed.

The operation of supplying the liquid pressure to the working pressure chamber 30 in the liquid pressure booster according to this embodiment is similar to the operation shown in FIG. 6 and the rest of the operation is similar to what is shown in FIG. 7. Further, the operation of the liquid pressure booster 50 according to this embodiment also is similar to what is shown in FIG. 7.

Figure 9:
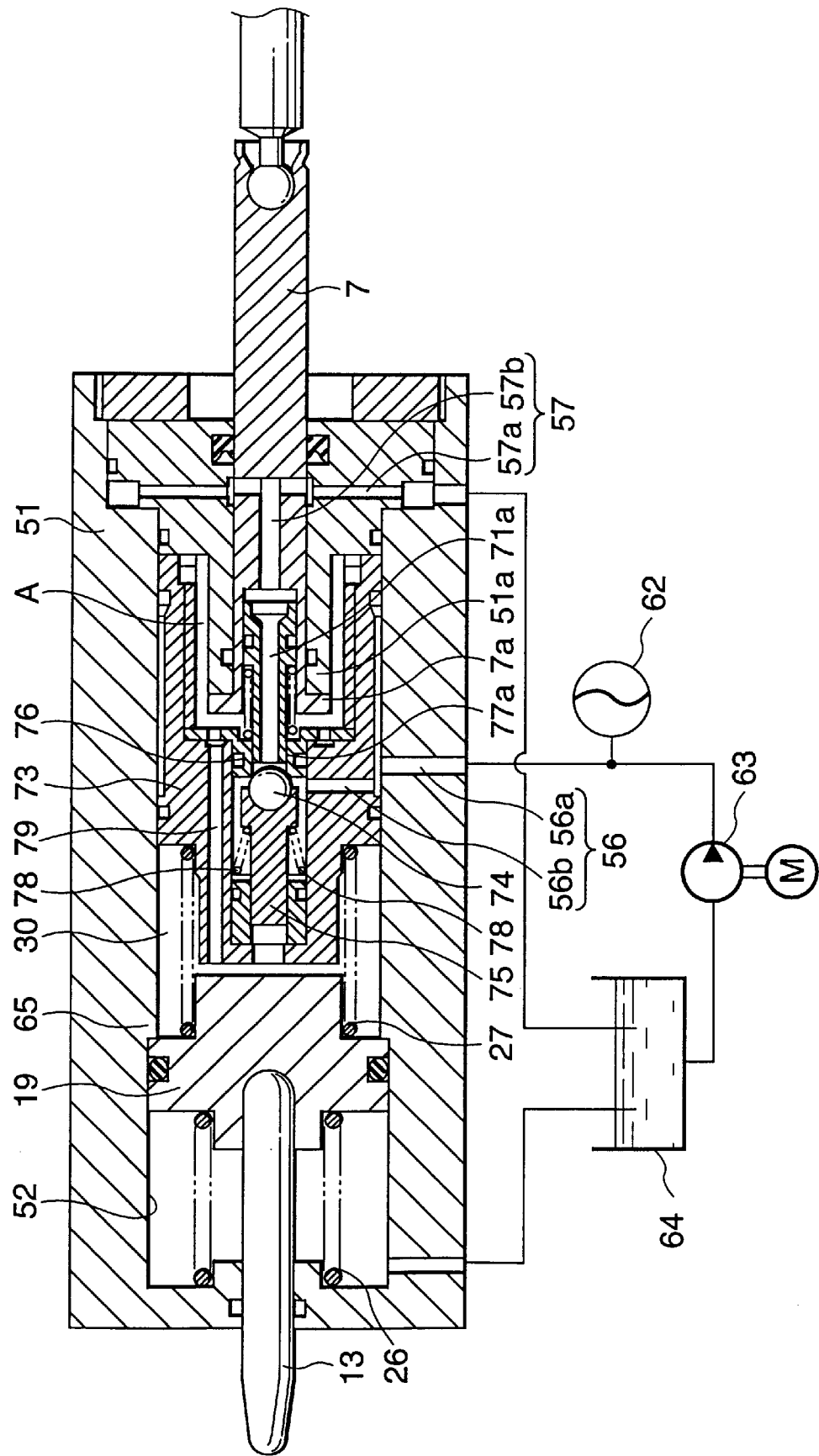
FIG. 9 is a sectional view of still another embodiment of the liquid pressure booster according to the present invention.

FIG. 9 shows still another exemplary fluid pressure booster embodying the invention in the form of a sectional view, wherein like reference numerals designate like component elements in the preceding embodiments thereof and the detailed description thereof will be omitted.

As shown in FIG. 9, a liquid pressure booster 50 according to this embodiment is a closed-center type liquid pressure booster similar to those shown in FIGS. 6 and 8. Moreover, though the liquid pressure booster 50 shown in FIGS. 6 and 8 employs a spool valve as a valve member for the control valve, the liquid pressure booster 50 according to this embodiment employs a control valve comprising a ball valve and a valve seat.

More specifically, unlike the case of FIG. 8, a control piston 73 is provided liquid-tightly and slidable in the stepped hole 52 of the housing instead of the cylindrical member 53. In this control piston 73, a valve disc 75 having a ball valve 74 is slidably provided and there is fixedly installed a first valve seat 76 on which the ball valve 74 can be seated. Further, a cylindrical second valve seat 77 is provided in the front end portion of the input rod 7 and when the input rod 7 is stroked forward, the second valve seat 77 is seated on the ball valve 74. During the non-operation, the ball valve 74 is seated on the first valve seat 76 by the spring force of a valve spring, whereas the second valve seat 77 is separated from the ball valve 74.

The portion 56b of the aforementioned supply hole 56 is bored diametrically in the control piston 73 and opened on the side of the ball valve 74 with respect to the first valve seat 76. Moreover, the aforementioned space A is provided on the side of the second valve seat 77 with respect to the first valve seat 76.

An axial hole 79 for communicating the working pressure chamber 30 with the space A is bored in the control piston 73. Further, the portion 57b of the aforementioned discharge hole 57 is bored in the input rod 7, and this portion 57b communicates with the space A via the inner hole 77a of the cylindrical second valve seat 77 while the second valve seat 77 is separated from the ball valve 74, whereas when the second valve seat 77 is seated on the ball valve 74, the portion 57b is cut off the space A. In the liquid pressure booster 50 according to this embodiment, the ball valve 74, the first and second valve seats 76 and 77 constitute a control valve, and the control piston 73 including this control valve constitutes a control means according to the present invention, the control means and the power piston 19 being disposed in series with a predetermined gap held therebetween.

The rest of the arrangement of the liquid pressure booster according to this embodiment is similar to the arrangement shown in FIG. 8.

In the liquid pressure booster 50 according to this embodiment thus arranged, a flange portion 7a at the front end of the input rod 7 is brought into contact with the stopper portion 51a of the housing 51 during the non-operation shown in FIG. 9 and forms a non-operating position as a rear limit as in the aforementioned preceding embodiments. In this non-operating condition, the supply hole 56 is cut off the space A since the ball valve 74 is seated on the first valve seat 76. In other words, the supply hole 56 is cut off from the working pressure chamber 30. Since the second valve seat 77 is separated from the ball valve 74, the discharge hole 57 communicates with the space A via the inner hole 77a of the second valve seat 76. In other words, the discharge hole 57 is caused to communicate with the working pressure chamber 30.

When the input rod 7 is stroked forward while the brake is actuated, the second valve seat 77 is also moved forward and seated on the ball valve 74, and the discharge hole 57 is cut off the space A. When the input rod 7 is moved forward further, the ball valve 74 is separated from the first valve seat 76 as the second valve seat 77 causes the valve disc 75 including the ball valve 74 to move forward. Then the supply hole 56 communicates with the space A, and the pressurized liquid introduced into the supply hole 56 is passed through a gap between the ball valve 74 and the first valve seat 76 before being introduced into the space A. When the pressurized liquid is introduced into the working pressure chamber 30 via the passage hole 76 further, it causes the power piston 19 to operate and produce an output as in the liquid pressure booster 50 in the aforementioned preceding embodiments, whereby MCY produces the brake pressure, thus actuating the brake.

Although the liquid pressure in the working pressure chamber 30 also acts on the control piston 73 then, the control piston 73 stays unmoved like the cylindrical member of the liquid pressure booster 50 as in the aforementioned preceding embodiments and is held in the non-operating position. Therefore, the stroke of the input rod 7 is suppressed to be an extremely short stroke like the liquid pressure booster 50 as in the aforementioned preceding embodiments.

As the liquid pressure in the working pressure chamber 30 also acts on the front end of the valve disc 75, moreover, the force added to the valve disc 75 by the liquid pressure is transferred to the brake pedal as counterforce.

When the brake is released, the second valve seat 77 is also moved back since the input rod 7 is moved back and the ball valve 74 is seated on the first valve seat 76, and the supply hole 56 is cut off the space A. When the input rod 7 is moved back further, the second valve seat 77 is moved back further and separated from the ball valve 74, whereby the discharge hole 57 is caused to communicate with the space A. Thus, the pressurized liquid in the working pressure chamber 30 is discharged into the reservoir 64 via the passage hole 79, the space A, the gap between the ball valve 74 and the second valve seat 77, the inner hole 77a of the second valve seat 77 and the discharge hole 57. The brake is released, accordingly.

When the liquid pressure source falls, the front end of the flange portion 7a of the input rod 7 is brought into contact with the control piston 73 via the first valve seat 76 as the input rod 7 is moved forward by stepping on the brake pedal and pushes the control piston 72 forward. Then the control piston 73 moves forward and is brought into contact with the power piston 19, thus pushing the control piston 73 forward. The power piston 19 together with the input rod 7 and the control piston 73 is integrally moved forward and produces an output to ensure that the brake is actuated even though the liquid pressure falls like the liquid pressure booster 50 as in the aforementioned preceding embodiments.

The rest of the operation/working-effect of the liquid pressure booster 50 according to this embodiment are similar to those referred to in FIG. 8.

Although the fluid pressure booster has been defined as a negative pressure booster or a liquid pressure booster in the aforementioned preceding embodiments, the invention is not limited to those embodiments but may be applicable to any fluid pressure booster to say nothing of any booster using compressed air as long as the fluid pressure booster comprises a working piston such as a power piston operating to produce an output through the action of fluid pressure, a control means such as a control valve for controlling the fluid pressure, and an input means such as an input rod for operating the control means.

The fluid pressure booster according to the present invention is applicable to any system other than a brake system necessitating a greater output obtainable by boosting an input.

As is obvious from the above description, the stroke of the input means can be set at an extremely short stroke close to substantially zero in the fluid pressure booster according to the present invention. As it has been arranged that the working piston is capable of continuing strokes even though the stroke of the input means is set at an extra short stroke, moreover, a greater output resulting from boosting the input of the input means can be produced.

When the fluid pressure falls, the working piston is operated with the stroke of the input means via the control means to ensure that an output can be produced without boosting an input to the fluid pressure booster even in a case where the fluid pressure falls. As it is only needed to arrange the working piston and the control means in series, the construction is extremely simplified.

In the fluid pressure boosters according to the invention of claims 3 and 4 in particular, the stroke of the input means can be set to various sized by the stroke control means provided between the control means and the input means. According to the invention of claim 4, the stroke of the input means can simply be set to various sizes by simply varying the spring constant of the spring of the stroke control means.

With the brake system according to the invention of claim 6, moreover, the stroke of the brake operating member such as a brake pedal can be set at an extra short stroke. Accordingly, the operation of the brake is facilitated and even when strong brake operating force is needed at the time of emergency brake, a greater brake force can be generated because the position of the stroke of the brake operating member remains almost unchanged.

Particularly in the case of actuating the brake in the low G zone, the idle stroke of the brake cylinder, the stroke of the brake operating member can simply be shortened to ensure that an idle stroke indispensable to a brake system such as the working piston, the master cylinder, the brake cylinder and the like of a liquid pressure booster is satisfactorily secured.

Moreover, the stroke of the brake operating member can freely be set by the stroke control means, regardless of the brake system provided ahead of the master cylinder.

What is claimed is:

1. A fluid pressure booster, comprising:

a housing;

a working piston for producing a working output by the action of a fluid pressure during the operation of the booster;

a valve member provided to the working piston in series, the valve member being contactable with the working piston;

a control valve disposed between the housing and the valve member, the control valve for controlling supply and discharge of the fluid pressure caused to act on said working piston;

an input rod stroking during the operation thereof to push the valve member to control the control valve, the input rod applying an input to the working piston through the valve member when a booster pressure falls;

a control piston which operates to suppress the stroke of the valve member using the fluid pressure acting on the working piston during the operation thereof;

wherein said working piston, the valve member, the control valve, said input rod and said control piston are disposed within the housing; and wherein said control valve does not stroke during a normal boosting operation.

2. A fluid pressure booster as claimed in claim 1, wherein the fluid pressure acting on the working piston acts on the control piston in a direction opposing to the input during the operation of the booster; and the control valve is controlled by the input and an acting force due to the fluid pressure acting on the control piston.

3. A fluid pressure booster as claimed in claim 1, further comprising stroke control means provided between the valve member and the input rod, the stroke control means for controlling the stroke of the input rod according to the input applied to the input rod.

4. A fluid pressure booster as claimed in claim 3, wherein said stroke control means comprises a spring provided compressively between the input rod and the valve member.

5. A fluid pressure booster as claimed in claim 1, wherein said fluid pressure booster is a negative pressure booster for boosting the input using a negative pressure or a liquid pressure booster for boosting the input using a liquid pressure.

6. A brake system at least comprising a fluid pressure booster as claimed in one of claims 1–5, and a brake master cylinder which is operated using the output of the fluid pressure booster and used to generate a brake pressure.

7. A fluid pressure booster as claimed in any one of claims 1–4, further comprising an input transmission member disposed within the housing, the input transmission member stroked by the input rod to transmit the input to the working piston if the fluid pressure falls, the input transmission member not stroked by the input rod during the operation of the booster;

wherein the control valve is disposed between the input transmission member and the valve member.

* * * * *